(12) United States Patent
Royer, Jr. et al.

(10) Patent No.: US 8,312,326 B2
(45) Date of Patent: *Nov. 13, 2012

(54) DELTA CHECKPOINTS FOR A NON-VOLATILE MEMORY INDIRECTION TABLE

(75) Inventors: Robert J. Royer, Jr., Portland, OR (US); Richard Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,890

(22) Filed: Apr. 12, 2011

(65) Prior Publication Data

US 2011/0276827 A1    Nov. 10, 2011

Related U.S. Application Data

(63) Continuation of application No. 12/345,997, filed on Dec. 30, 2008, now Pat. No. 7,925,925.

(51) Int. Cl.
*G06F 11/00* (2006.01)

(52) U.S. Cl. .......................................................... 714/43

(58) Field of Classification Search ................... 714/22, 714/43; 711/103
See application file for complete search history.

(56) References Cited

U.S. PATENT DOCUMENTS

| | | | |
|---|---|---|---|
| 5,437,020 A | 7/1995 | Wells et al. | |
| 6,170,066 B1 | 1/2001 | See | |
| 6,591,329 B1 | 7/2003 | Kakinuma et al. | |
| 2001/0029564 A1 | 10/2001 | Estakhri et al. | |
| 2003/0041210 A1 | 2/2003 | Keays | |
| 2005/0036390 A1 | 2/2005 | Nakada et al. | |
| 2005/0144363 A1 | 6/2005 | Sinclair | |
| 2006/0294339 A1 | 12/2006 | Trika et al. | |
| 2007/0005928 A1 | 1/2007 | Trika et al. | |
| 2007/0150645 A1 | 6/2007 | Chandramouli et al. | |
| 2007/0168698 A1 | 7/2007 | Coulson et al. | |
| 2008/0183953 A1 | 7/2008 | Flynn et al. | |
| 2008/0189476 A1 | 8/2008 | Ishimoto et al. | |
| 2009/0089610 A1 | 4/2009 | Rogers et al. | |
| 2009/0150599 A1 | 6/2009 | Bennett | |
| 2009/0287874 A1 | 11/2009 | Rogers et al. | |

*Primary Examiner* — Scott Baderman
*Assistant Examiner* — Neil Miles
(74) *Attorney, Agent, or Firm* — Buckley, Maschoff & Talwalkar LLC

(57) ABSTRACT

According to some embodiments, delta checkpoints are provided for a non-volatile memory indirection table to facilitate a recovery process after a power loss event.

12 Claims, 4 Drawing Sheets

DELTA CHECKPOINTS FOR A NON-VOLATILE MEMORY INDIRECTION TABLE

CROSS-REFERENCE TO RELATED APPLICATION

The present application is a continuation of co-pending U.S. patent application Ser. No. 12/345,997 entitled "DELTA CHECKPOINTS FOR A NON-VOLATILE MEMORY INDIRECTION TABLE" filed Dec. 30, 2008. The entire contents of that application are incorporated herein by reference.

BACKGROUND

In some cases, a system may maintain an indirection table to facilitate the use of a non-volatile memory as a storage device. For example, an indirection table might be used to facilitate the use of a NAND storage element and, in particular, an appropriate recovery of a memory state of the NAND storage element after a power loss event.

In order to recover an appropriate memory state of the non-volatile memory (e.g., after a power loss event), the system may need to re-create the indirection table. This process, however, can take a considerable amount of time. For example, it might take several minutes to recreate an indirection table associated with a 10 Gigabyte (GB) NAND storage element. Moreover, periodically saving the entire indirection table, such as an 8 Megabyte (MB) indirection table, may degrade the performance of the system and/or result in Quality of Service (QOS) and other issues associated with the non-volatile memory.

DETAILED DESCRIPTION

Figure 1:
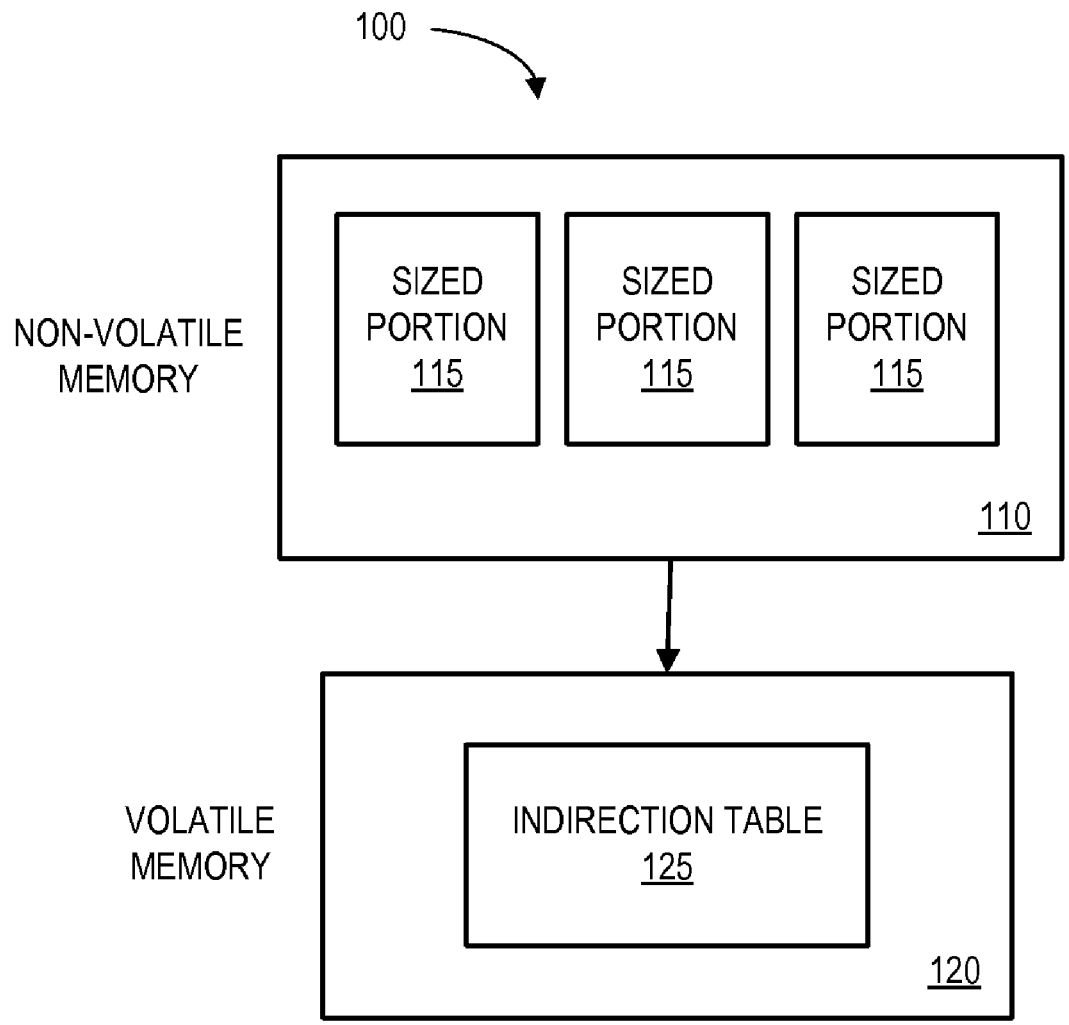
FIG. 1 is a block diagram of a system.

FIG. 1 is a block diagram of a system 100. In particular, the system 100 includes a non-volatile memory 110 and a volatile memory 120. The non-volatile memory 110 might be associated with, for example, a NAND storage element. Note that embodiments described herein may be associated with any other types of non-volatile storage technologies. Moreover, the volatile memory 120 may be associated with any appropriate type of storage (including, in some cases, other non-volatile storage elements).

In some cases, the system may maintain an indirection table 125 (e.g., in the volatile memory) to facilitate the use of a non-volatile memory 110 as a storage device. For example, the indirection table 125 may represent a mapping of logical addresses to physical addresses in connection with sized portions 115 of the non-volatile memory 110. In order to recover an appropriate memory state of the non-volatile memory 110 (e.g., after a power loss event), the system 100 may need to re-create the indirection table 125. This process, however, can take a considerable amount of time.

By way of example only, some embodiments herein are associated with systems and methods associated with NAND management software (including firmware) that use the indirection table 125 to recover an appropriate state after a "power loss event" (e.g., an unexpected power loss or crash). Note that some embodiments are described in connection with a NAND page level indirection system. In this case, a NAND erase block may contain physical NAND pages that are to be erased together.

After a power loss event, the system 100 may reads metadata for each indirection table entry sized portion of a NAND memory (e.g., a NAND page or a NAND erase block) to recover the state of the indirection table 125. While this process may be relatively quick for erase block indirection systems (e.g., a NAND thumb drive), it might take several minutes to recover an indirection system for implementations that use page-level indirection systems and/or large NAND capacities. Recovering the indirection table 125 may be slow, for example, because of a need to read every NAND page on a NAND device.

According to some embodiments, a runtime component may be provided to log delta information. Moreover, some embodiments include power fail recovery code that uses saved delta information after a power loss event. Both of these components may, for example, use a data structure referred to herein as a "delta checkpoint," which might include a record (e.g., in the last page of an erase block) of the indirection system updates for the NAND pages in that erase block.

Figure 2:
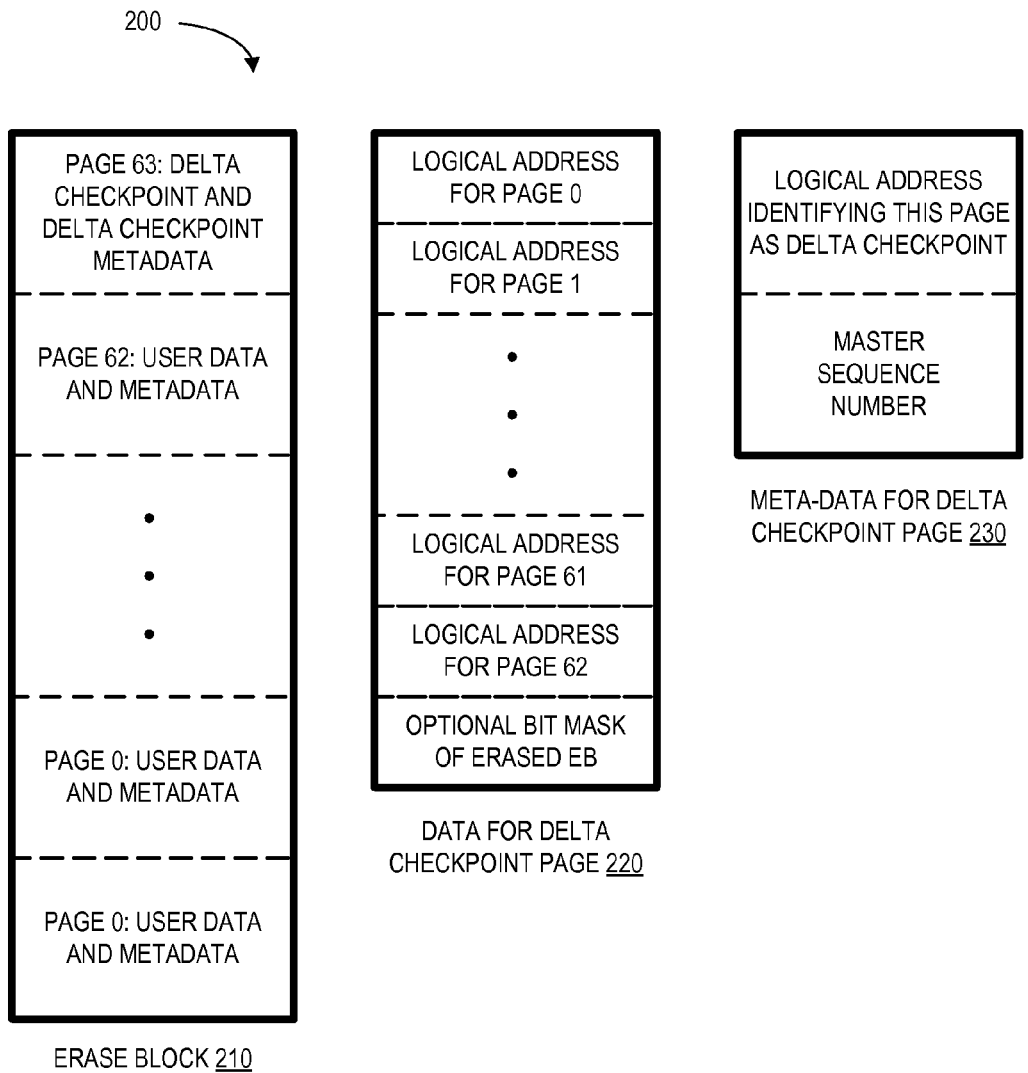
FIG. 2 illustrates an erase block layout and delta checkpoint information according to some embodiments.

By way of example, FIG. 2 is an illustration 200 of an erase block layout and associated delta checkpoint information. As shown in FIG. 2, an erase block 210 may include 63 pages that potentially contain user data and the last (or 64th) page of the erase block 210 may contain a delta checkpoint structure 220. The delta checkpoint structure 220 might, for example, record indirection system mapping updates (in this case, the logical addresses) for each of the 63 previous written pages containing user data. According to some embodiments, a bitmask representing which erase blocks are still erased may also be saved in the delta checkpoint structure 220 to help determine which erase blocks do not need to be erased again after a power loss event.

The metadata 230 for the checkpoint page may include a unique signature (e.g., a special logical address) that identifies the page as a delta checkpoint page. Note that, according to some embodiments, the signature may be omitted if a strict write ordering policy is observer (e.g., to ensure that only delta checkpoint data is to be written to the pages scanned). Moreover, according to some embodiments, a sequence number is included in the metadata for the checkpoint page to help determine an order which the erase blocks were written.

Figure 3:
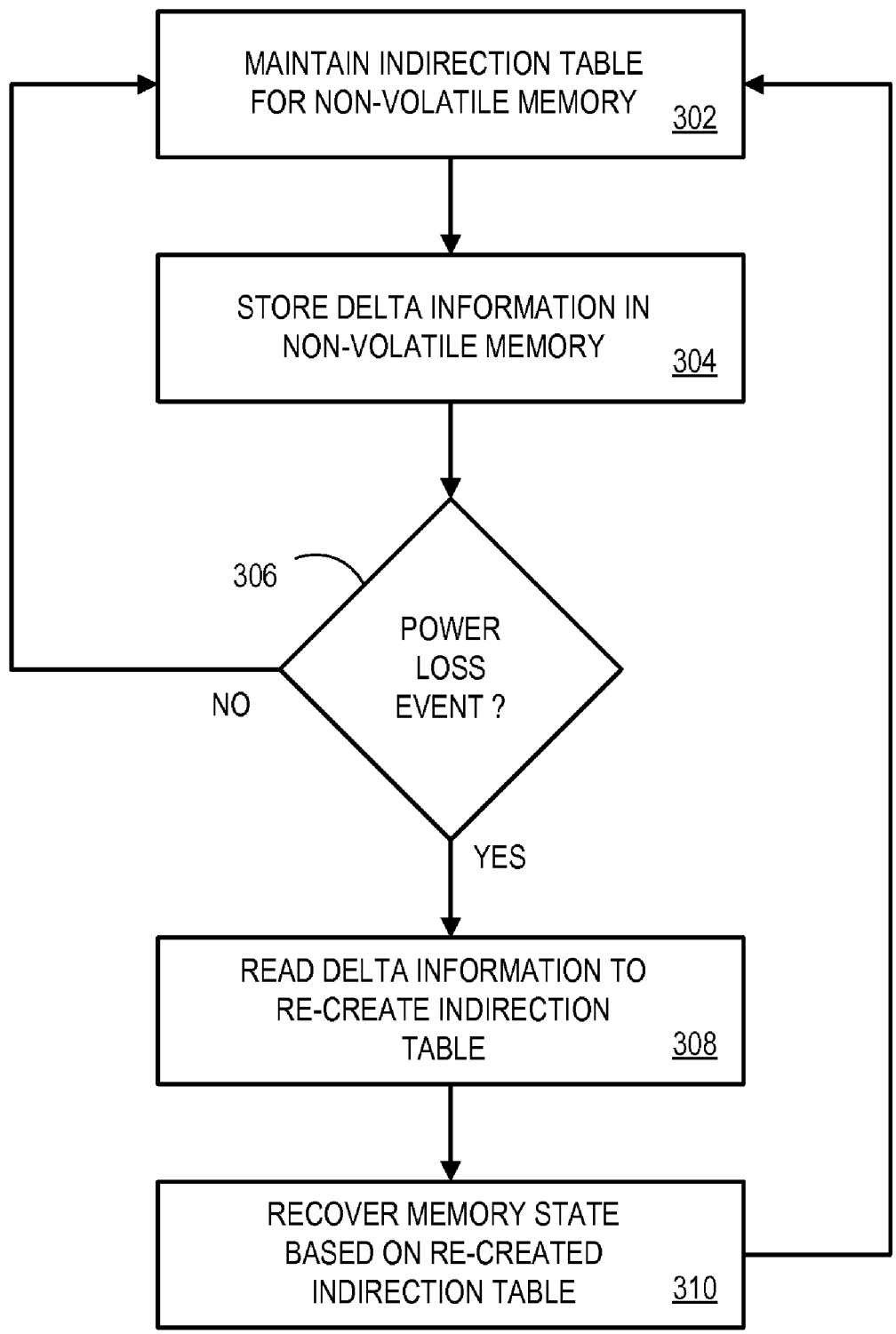
FIG. 3 is a flow chart of a method according to some embodiments.

FIG. 3 is a flow chart of a method according to some embodiments. The flow charts described herein do not necessarily imply a fixed order to the actions, and embodiments may be performed in any order that is practicable. The method of FIG. 3 may be associated with, for example, a system 100 such as the one described with respect to FIG. 1. Note that any of the methods described herein may be performed by hardware, software (including lower level code, such as microcode), or a combination of hardware and software. For example, a storage medium may store thereon instructions that when executed by a machine result in performance according to any of the embodiments described herein.

At 302, an indirection table associated with sized portions of a non-volatile memory is maintained. The indirection table may, for example, include a mapping of logical-to-physical addresses. According to some embodiments, the non-volatile memory comprises a NAND memory and the sized portions are pages of the NAND memory.

At 304, delta information may be stored in the non-volatile memory. The delta information may be, for example, associated with updates to the indirection table in connection with a plurality of the sized portions of the non-volatile memory. For example, when the non-volatile memory is a NAND memory and the sized portions are pages that include user data and metadata, the plurality of pages might represent an erase block.

According to some embodiments, the delta information is a delta checkpoint page that includes (i) data for the delta checkpoint page and (ii) metadata for the delta checkpoint page. For example, the data for the delta checkpoint page may indicate a logical address for each page in the erase block. The data for the delta checkpoint page may further include, according to some embodiments, a bitmask of erased blocks. The metadata for the delta checkpoint page may include, for example, a logical address identifying the page as a delta checkpoint page along with a master sequence number.

By way of example, during run time a next erase block to be written to may be selected. Because of NAND properties, an erase block may need to be erased before it can be written and the pages within the erase block might need to be written in order (e.g., first page 0, then page 1, then page 2). When the new erase block is selected, a delta checkpoint entry may be initialized in system memory, such as Dynamic Random Access Memory (DRAM) or Static Random Access Memory (SRAM), to track the logical address for all writes to that particular erase block. As each physical page is written in the erase block, the logical address for the physical page may be saved into the volatile delta checkpoint for the corresponding physical page. After all 63 pages of user data have been written, the volatile delta checkpoint data may be written to the last physical page of the erase block, including a sequence number in the atomic metadata that is greater than or equal to the largest sequence number in the user data portion of the erase block (e.g., page 62).

If no power loss event is detected at 306, the process may continue to maintain the indirection table at 302 (periodically storing delta information as appropriate).

When a power loss event is detected at 306, the system may begin a recovery process. In particular, the delta information may be read from the non-volatile memory and the indirection may be re-created (e.g., based at least in part on delta information) at 308. The memory state associated with the non-volatile may then be recovered at 310 in accordance with the re-created indirection table.

Thus, after a power loss event (e.g., an unexpected power loss), the indirection table may be recovered. Note that the data stored in the last page of an erase block (that erase block's delta-checkpoint) may contain the elements of the metadata stored in all the pages of that erase block that are needed to recover the indirection table. Thus, the read of the delta checkpoint may eliminate the need to read all the pages' metadata in the erase block. In the example of FIG. 2, the power-fail recovery time may be reduced by a factor of 64 (since data for a single page per erase block is read instead of the metadata of all 64 pages in the erase block. This following pseudocode may be associated with, for example, a recovery algorithm to be executed after a power loss event. In particular, after the power loss event, the appropriate data may be read by the system (e.g., the delta information may be read from the non-volatile memory):

```
PowerFailRecovery ( ){
// step one: scan all EB for deltacheckpoint
Let GlblSequenceNumber =0
Let EbMasterSequenceNumber [NumberOfEbs] be an array,
initialized to zeroes.
initialize and set all entries in IndirectionTable to INVALID
for (each non defective EB) {
    page = Read data/metadata from page (NumberOfPagesPerEB-1)
    for EB
    if (page.metadata.logicaladdress == deltacheckpoint) {
        RebuildFromDeltaCheckpoint (EB, page.data, page.metadata)
        EbMasterSequenceNumber[EB] =
        page.metadata.sequenceNumber
        if (page.metadata.sequenceNumber > GlblSequenceNumber){
            // update the glbl seq # to higher of the two sequence #
            GlblSequenceNumber = page.metadata.sequenceNumber
        }
    } else {
        Read page 0 of EB from NAND
            if (page == Blank) {
                Mark EB as blank
            } else {
                RebuildFromAtomicMetadata (EB)
            }
    } // end else not delta checkpoint
} // end for
```

After the appropriate data is read, the system may rebuild the indirection table based on the delta information:

```
RebuildFromDeltaCheckpoint (EB, DeltaCheckpoint, Metadata) {
//rebuild metadata from delta checkpoint
// DeltaCheckpoint is table size (NumberOfPagesPerEB-1) of Logical
        page addresses
for (page = 0..(NumberOfPagesPerEB-2)) {
    LA = DeltaCheckpoint[page].logicalAddress;
    if ( LA != INVALID) {
        //logical address mapping is valid. Test if need to update indirection
    tables
        oldPhysicalAddr = IndirectionTable[LA]
        if (oldPhysicalAddr != INVALID) {
            oldSeqNumber =
                EBMasterSequenceNumber[oldPhysicalAddr.EB]
            if (Metadata.SequenceNumber >= oldSeqNumber){
                //page contains more recent user data, update indirection
                system
                IndirectionTable[LA] = page
            }
        } else {
            IndirectionTable[LA] = page;
        }
    }
}
```

Finally, the re-creation of the indirection table may be completed based on the "atomic" metadata associated with recent changes to the non-volatile memory:

```
RebuildFromAtomicMetadata (EB) {
// use atomic metadata to do the rebuild
for (page = 0..(NumberOfPagesPerEB-2)) {
    Meta = Read metadata from NAND of page in EB
    LA = Meta.logicalAddress
    if (LA != INVALID) {
        oldPhysicalAddr = IndirectionTable[LA]
        if (oldPhysicalAddr != INVALID) {
            oldSeqNumber =
                EBMasterSequenceNumber[oldPhysicalAddr.EB]
            if (Meta.SequenceNumber >= oldSeqNumber){
                //page contains more recent user data; update indirection
                system
                IndirectionTable[LA] = page
```

```
        }
    } else {
        //no previous mapping so just update indirection table
        IndirectionTable[LA] = page
        }
    }
  }
}
```

Note that after a power failure, NAND management software might be unable to detect whether or not an erase block is erased. As a result, the system may re-erase potentially already-erased erase blocks. Such an approach may increase latency time associated with a re-boot/recovery process. To reduce latency, an erased erase block bitmask may be included with every delta checkpoint reflecting which NAND erase blocks are actually erased. During the power fail recovery process, the system may then update a "master" bitmask with the data found in the delta checkpoint (e.g., in a way similar to way a sequence number is handled). When finished, the "master" bitmask may reflect which erase blocks are actually erased (and do not need to be erased again).

According to some embodiments, it may be desirable to write to multiple erase blocks at one time and/or to relax write ordering rules. Note that the example described with respect to FIG. 3 assumed that the management software only wrote to one erase block at a time in linear order. In some implementations, it may be helpful to write to multiple active erase blocks. This might be accommodated by keeping a delta checkpoint in DRAM/SRAM for every erase being written to. Because the same logical address might written to in multiple active erase blocks, the delta checkpoint in DRAM/SRAM might be updated for the older erase blocks to mark that physical address as invalid or stale. That is, a delta checkpoint entry may be invalidated when more than one erase block is written to at the same time. For example, the following pseudocode may be associated with an algorithm according to such an embodiment:

```
VolatileCheckpointUpdateInCaseOfMultipleActiveEBs
On User write of logicaladdress logAddr to physical location destPhyAddr
oldSrcPhyAddr = IndirectionTable[logAddr]
for each active EB that contains logAddr {
    // currently have an active delta checkpoint
    Deltacheckpoint[EB][srcPhyAddr] = INVALID
}
IndirectionTable[logAddr] = destPhyAddr
```

Thus, embodiments described herein may provide systems and methods to reduce power fail recovery time. Such approaches may, for example, avoid the need for multi-minute recovery times that could be associated with a 16 GB NAND device after an unexpected power loss. For example, such recovery times might be reduced to less than five seconds for a similar non-volatile memory device. Moreover, embodiments described herein may reduce runtime latency for each checkpoint event because the delta checkpoint may only contain a relatively small amount of data (e.g., less than a single NAND page). Because the delta checkpoint is relatively small, the system may be able write the information in a few hundred microseconds (e.g., causing only a minor impact to latency and QOS metrics).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to NAND memory, note that embodiments may be associated with any other type of memory. Moreover, other elements of data and/or metadata may be provided instead of, or in addition to, those described herein.

Figure 4:
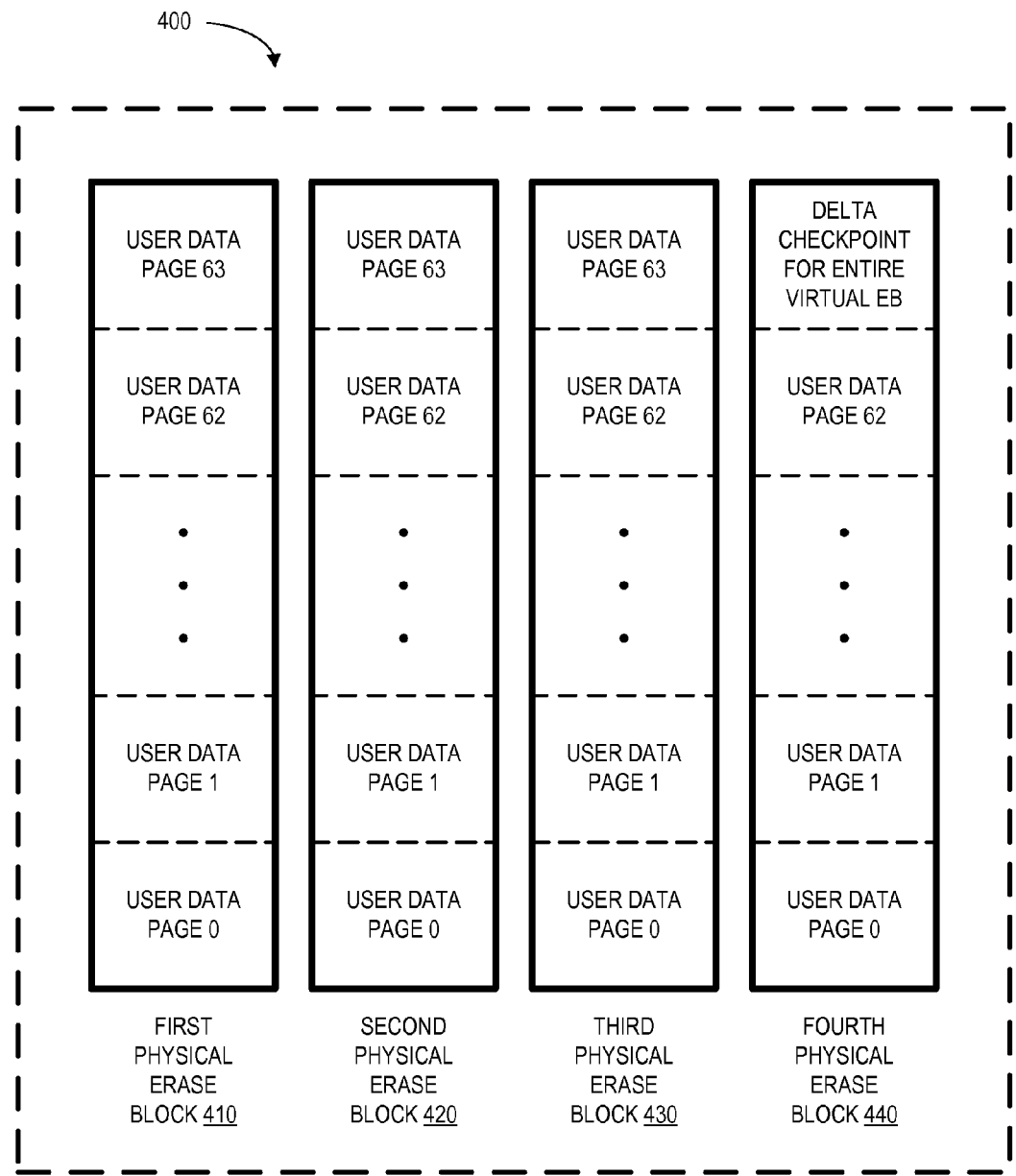
FIG. 4 illustrates a virtual erase block according to some embodiments.

In addition, note that the concept of an erase block can, according to any of the embodiments described herein, span multiple erase blocks. For example, FIG. 4 illustrates a virtual erase block 400 that spans four physical erase blocks 410, 420, 430, 440 according to some embodiments. Moreover, a single delta checkpoint is provided for the entire virtual erase block. Such an approach may further the number of pages that need to be read during power fail recovery by growing the size of the portion associated with the delta checkpoint to span four erases blocks (reducing the number of pages that need to be read during power fail recovery by a factor of four and, as a result, potentially improving the power fail recovery time by a factor of four).

The several embodiments described herein are solely for the purpose of illustration. Persons skilled in the art will recognize from this description other embodiments may be practiced with modifications and alterations limited only by the claims.

What is claimed is:

1. A method, comprising:
   maintaining an indirection table associated with pages of a non-volatile memory, the indirection table including a mapping of logical-to-physical addresses; and
   storing a delta checkpoint page in the non-volatile memory, the delta checkpoint page being associated with updates to the indirection table in connection with an erase block comprising a plurality of the pages of the non-volatile memory, wherein each page includes user data and metadata and the delta checkpoint page includes (i) a logical address for each page in the erase block and (ii) metadata for the delta checkpoint page, including a logical address identifying the page as a delta checkpoint page.

2. The method of claim 1, wherein the non-volatile memory comprises a NAND memory.

3. The method of claim 1, wherein the delta checkpoint page further includes a bitmask of erased blocks.

4. The method of claim 1, further comprising:
   after a power loss event, reading the delta checkpoint page from the non-volatile memory;
   re-creating the indirection table based at least in part on delta checkpoint page; and
   arranging to recover a memory state associated with the non-volatile in accordance with the re-created indirection table.

5. A method, comprising:
   maintaining an indirection table associated with pages of a non-volatile memory, the indirection table including a mapping of logical-to-physical addresses; and
   storing a delta checkpoint page in the non-volatile memory, the delta checkpoint page being associated with updates to the indirection table in connection with an erase block comprising a plurality of the pages of the non-volatile memory, wherein each page includes user data and metadata and the delta checkpoint page includes (i) data for the delta checkpoint page and (ii) a logical address identifying the page as a delta checkpoint page.

6. The method of claim 5, wherein the delta checkpoint page includes a master sequence number.

7. The method of claim 5, wherein a number of different erase blocks represent a virtual erase block.

8. An apparatus, comprising:
an indirection table structure associated with pages of a non-volatile memory, the indirection table including a mapping of logical-to-physical addresses; and
a non-volatile memory to store a delta checkpoint page, the delta checkpoint page being associated with updates to the indirection table in connection with an erase block comprising a plurality of the pages of the non-volatile memory, wherein the delta checkpoint page includes: (i) data for the delta checkpoint page including a logical address for each page in the erase block, and (ii) metadata for the delta checkpoint page, including a logical address identifying the page as a delta checkpoint page and a master sequence number, and further wherein a delta checkpoint entry is to be invalidated when more than one erase block is written to at the same time.

9. The apparatus of claim 8, wherein the non-volatile memory comprises a NAND memory.

10. The apparatus of claim 9, further comprising:
a recovery apparatus to, after a power loss event:
read the delta checkpoint page from the non-volatile memory,
re-create the indirection based at least in part on the delta checkpoint page, and
arrange to recovery a memory state associated with the non-volatile memory in accordance with the re-created indirection table.

11. The apparatus of claim 8, wherein the delta checkpoint page includes a master sequence number.

12. The apparatus of claim 8, wherein a number of different erase blocks represent a virtual erase block.

* * * * *